US006899252B2

(12) United States Patent
Logan et al.

(10) Patent No.: US 6,899,252 B2
(45) Date of Patent: May 31, 2005

(54) SEPARATOR FOR AND MEDICATION DOSAGE CONTAINER

(75) Inventors: Maurus Logan, Elizabeth, NJ (US); Chester Kolton, Westfield, NJ (US); Michael Norman, East Brunswick, NJ (US); Robert Whittemore, Middletown, NY (US)

(73) Assignee: Medcount Systems, L.L.C., Elizabeth, NJ (US)

( * ) Notice: Subject to any disclaimer, the term of this patent is extended or adjusted under 35 U.S.C. 154(b) by 179 days.

(21) Appl. No.: 10/285,163

(22) Filed: Oct. 31, 2002

(65) Prior Publication Data

US 2004/0084473 A1 May 6, 2004

(51) Int. Cl.[7] .................................................. B65G 59/00

(52) U.S. Cl. .......................................... 221/92; 206/538

(58) Field of Search ................................ 206/538, 536, 206/540, 457; 221/92, 265, 263, 298; 220/521, 545.2, 545, 575

(56) References Cited

U.S. PATENT DOCUMENTS 4,475,654 A * 10/1984 Fruchter ..................... 206/538

* cited by examiner

*Primary Examiner*—Kenneth Noland
(74) *Attorney, Agent, or Firm*—James J. Daley

(57) ABSTRACT

A separator insertable into a medicine container and thereupon defining upper and lower compartments in the medicine container, the separator having a separating portion pivotally supported for movement into a first position for forming the upper and lower compartments and into a second position providing access to the lower compartment, the separator including latching structure for releasably maintaining the separator portion in the first position.

20 Claims, 6 Drawing Sheets

SEPARATOR FOR AND MEDICATION DOSAGE CONTAINER

FIELD OF THE INVENTION

This invention relates generally to medication dosage control and pertains more particularly to a separator for a medication dosage container having facility for dosage control.

BACKGROUND OF THE INVENTION

Commonly-assigned, copending U.S. patent application Ser. No. 10/124,785 (the '785 patent application) addresses the so-called "secondary" drug problem, i.e., medication usage errors. As noted therein, this problem is heightened when one considers that the vast majority of medication users are elderly and may have vision and memory difficulties and that many thereof are required to take different medicines with different dosages over different time periods.

The '785 patent application provides a medicine container, comprising an upstanding body having an open mouth and a hollow interior bounded by a sidewall and a separator secured in the body and defining upper and lower compartments, the upper compartment opening into the body open mouth, the lower compartment being accessible while the separator is secured in the body. In one embodiment, the separator is insertable into a standard medicine container and has a separating portion defining both a floor for the upper compartment and a ceiling for the lower compartment. The separating portion is pivotally supported to move between positions opening and closing the lower compartment.

In use of the above-described container of the '785 patent application, a multiple time period dosage, e.g., a one-month's supply, of a given medication is inserted into the lower compartment. A lesser time period dosage, e.g., a one-week's supply, of the given medication is now withdrawn from lower compartment and is inserted into the upper compartment. A closure member is thereupon applied to the container and the container is thus set for a one-week supply of medication, removable daily from the upper compartment. This procedure applies on a weekly basis until the supply of medication in the lower compartment is depleted.

As noted in the '785 patent application, the prior art evidences various approaches seen to address the secondary drug problem. Noted particularly in the '785 patent application, with remarks distinguishing the same, are U.S. Pat. No. 4,460,106, U.S. Pat. No. 3,730,387, U.S. Pat. No. 4,420,083, U.S. Pat. No. 4,475,654, U.S. Pat. No. 6,347,705 B1 and U.S. Pat. No. 4,475,654. The '785 patent application also notes, as prior art, a commercially-available medicine container having a cup member defining an upper compartment and removable from the container to permit access to a lower compartment containing medication.

SUMMARY OF THE INVENTION

The present invention has as its primary object the provision of other versions of separators for medication dosage containers shown in the '785 patent application and medication dosage containers employing the same.

In attaining these and other objects, the present invention provides a separator insertable into a medicine container and thereupon defining upper and lower compartments in the medicine container, the separator having a separating portion pivotally supported for movement into a first position for forming the upper and lower compartments and into a second position providing access to the lower compartment, the separator including latching structure for releasably maintaining the separator portion in the first position.

In another aspect, the invention provides a medicine container, comprising an upstanding body having an open mouth and a hollow interior bounded by a sidewall and a separator resident in the container hollow interior, the separator having a separating portion pivotally supported for movement into a first position for forming upper and lower compartments in the container and into a second position providing access to the lower compartment, the separator including latching structure for releasably maintaining the separating portion in the first position.

The foregoing and other features of the invention will be further understood from the ensuing detailed description of preferred embodiments and practices and from the drawings, wherein like reference numerals identify like components throughout.

DETAILED DESCRIPTION OF PREFERRED EMBODIMENTS AND PRACTICES

Figure 2:
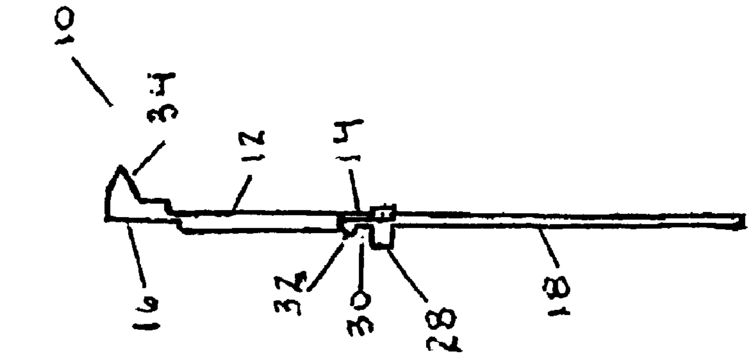
FIG. 2 is a right side elevation of FIG. 1.
Figure 1:
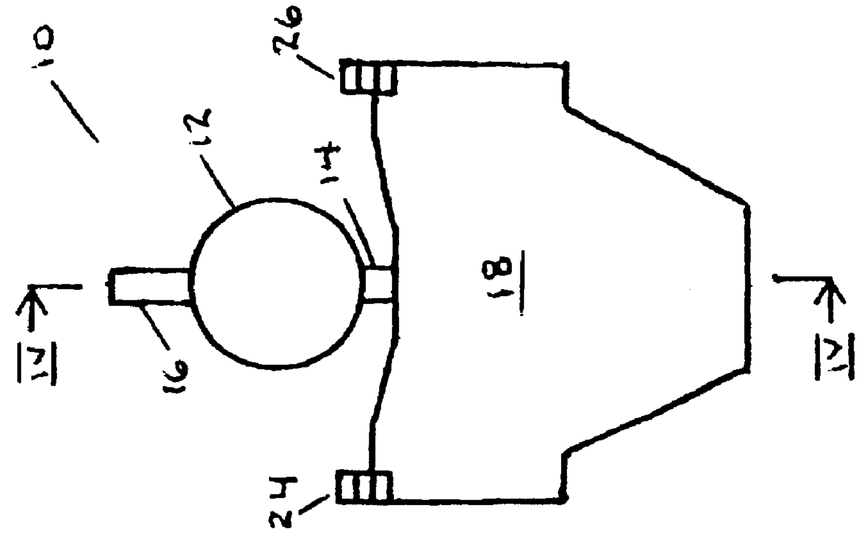
FIG. 1 is a front elevation of a first embodiment of a separator in accordance with the invention.
Figure 3:
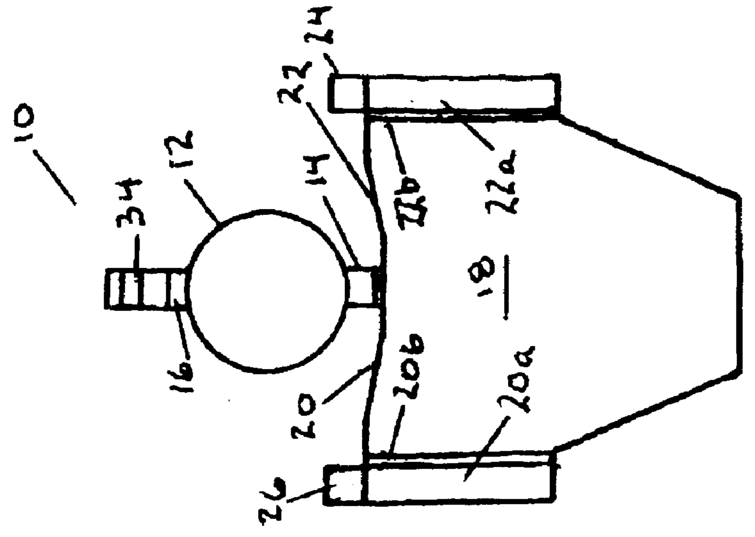
FIG. 3 is a rear elevation of the separator of FIG. 1.
Figure 4:
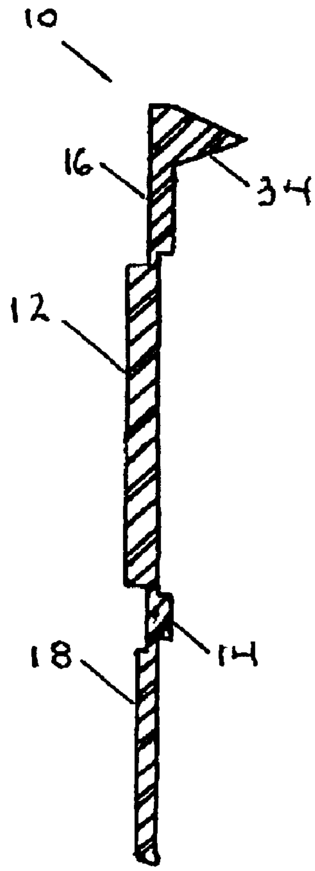
FIG. 4 is an enlarged sectional view of the separator of FIG. 1 as would be seen from plane IV—IV of FIG. 1.

Referring to FIGS. 1–4, separator 10 is comprised of a sheet member, preferably a molded plastic member, having a separating portion 12, pivotally supported by hinge portion 14 and having a tab portion 16 pivotally supported by separating portion 12.

Hinge portion 14 is pivotally supported by lower sheet member portion 18 which defines wings 20 and 22, end parts 20*a* and 22*a* of wings 20 and 22 being joined thereto by reduced thickness portions 20*b* and 22*b*.

Wing end parts 20*a* and 20*b* support latching structures 24 and 26, each of which defines a shelf part 28, a recess 30 and an upper part 32.

Tab portion 16 has a gripping projection 34 extending outwardly thereof.

Figure 5:
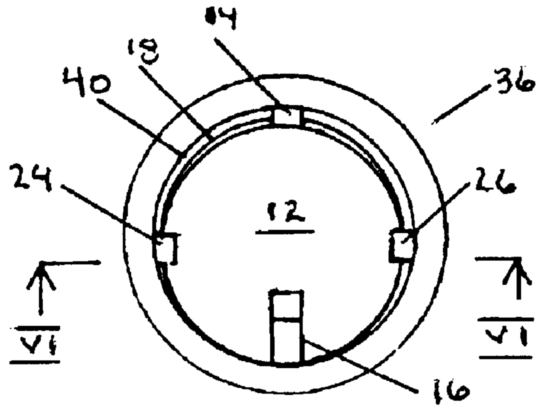
FIG. 5 is a top plan view of the FIG. 1 separator assembled with a container.
Figure 6:
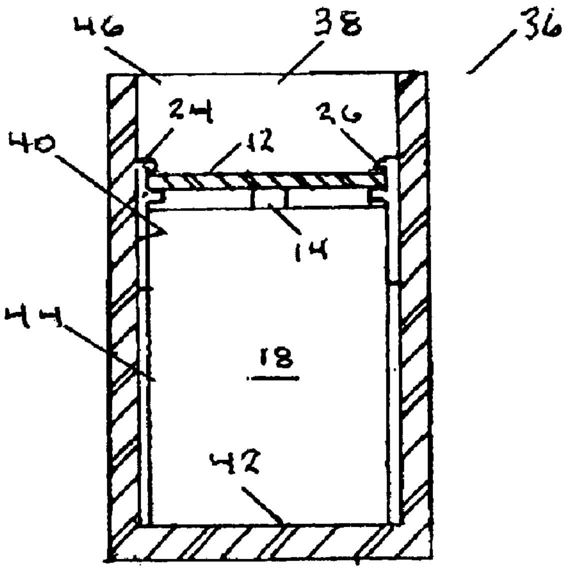
FIG. 6 is a sectional view as would be seen from plane VI—VI of FIG. 5.

In FIGS. 5 and 6, separator 10 is shown assembled with container 36. In reaching this assembly, separator 10 is inserted into the open mouth 38 of container 36 and pushed into the container hollow interior. In the course of insertion, lower portion 18 takes the shape of the container interior, being self-flexed into engagement with container interior sidewall 40. The vertical length of lower portion 18 is selected such that when the bottom thereof engages floor 42, latching structures 24 and 26 are vertically recessed from the upper end of sidewall 40 by the length of tab portion 16. At this juncture, a long term supply of medication dosage is placed in container 36 below latching structures 24 and 26.

Separating portion 12 is now pivoted onto latching structures 24 and 26 and beyond upper parts 32 thereof to come to rest on shelf parts 28, the periphery of separating portion 12 residing in part in recesses 30 of latching structures 24 and 26. A sensible click occurs in the course of engaging separating portion 12 with latching structures 24 and 26.

At this juncture, upper and lower compartments 44 and 46 exist in container 36, with the long term supply of medication dosage being contained in lower compartment 44. Container 36 may be inverted without movement of the medication dosage out of lower compartment 44, given the latched state of separating portion 12 in closed relation relative to lower compartment 44.

A short term medication dosage is now placed in upper compartment 46, either from the supply of medication used in loading lower compartment 44 or by opening separating portion 12 by pulling tab portion 16 upwardly and releasing separating portion 12 from its latched state, removing the short term medication dosage from lower compartment 44, relatching separating portion 12 and then placing the short term medication in upper compartment 46.

Figure 7:
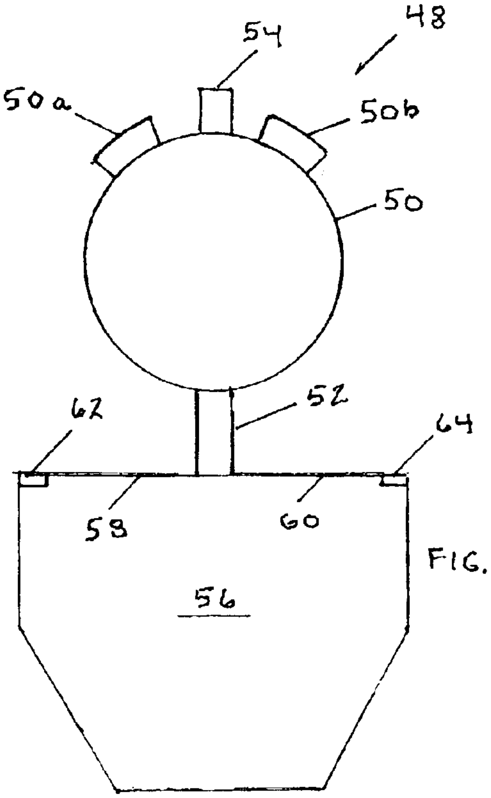
FIG. 7 is a front elevation of a second embodiment of a separator in accordance with the invention.
Figure 8:
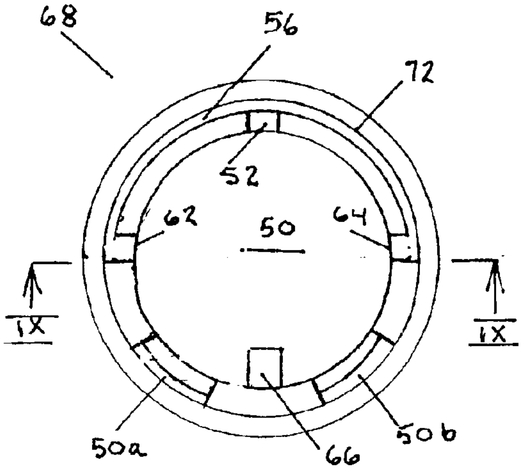
FIG. 8 is a top plan view of the separator of FIG. 7 assembled with a container.
Figure 9A:
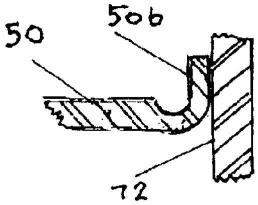
FIG. 9A is an enlarged, partial and sectioned view showing the latching structure of the second embodiment.
Figure 9:
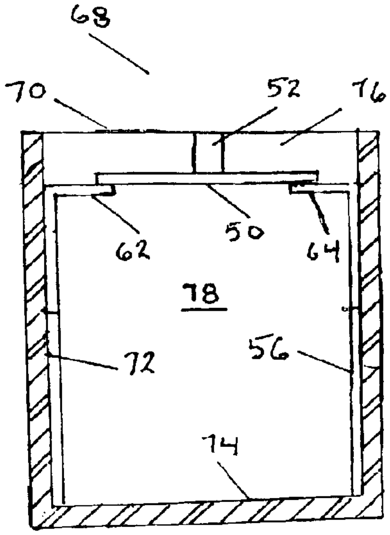
FIG. 9 is a sectional view as would be seen from plane IX—IX of FIG. 8.

Turning to FIGS. 7–9, separator 48 is again a sheet member, preferably of plastic material, and includes separating portion 50, pivotally supported by hinge portion 52 and having a tab portion 54 pivotally supported by separating portion 50. Wedging tabs 50*a* and 50*b* extend outwardly of separating portion.

Hinge portion 52 is pivotally supported by lower sheet member portion 56 which defines wings 58 and 60.

Wings 58 and 60 support ledges 62 and 64, each of which forms a right angle with lower portion 56.

Tab portion 54 has a gripping projection 66 extending outwardly thereof.

In FIGS. 8 and 9, separator 48 is shown assembled with container 68. In reaching this assembly, separator 48 is inserted into the open mouth 70 of container 68 and pushed into the container hollow interior. In the course of insertion, lower portion 56 takes the shape of the container interior, being self-flexed into engagement with container interior sidewall 72. The vertical length of lower portion 56 is selected such that when the bottom thereof engages floor 74, ledges 62 and 64 are vertically recessed from the upper end of sidewall 72 by the length of tab portion 54.

Separating portion 50 is now pivoted to rest on ledges 62 and 64. In the course of this pivoting, wedging tabs 50*a* and 50*b* assume the disposition shown for wedging tab 50*b* in FIG. 9A, i.e., in frictional engagement with sidewall 72 of container 68. As is further seen in FIG. 9A, wedging tab 50*b* (and wedging tab 50*a*) is thinner than separating portion 50, facilitating bending of wedging tab into its illustrated disposition.

At this juncture, upper and lower compartments 76 and 78 exist in container 68. Access to the lower compartment is gained by opening separating portion 50 by pulling tab portion 54 upwardly and releasing separating portion 50 from its latched state.

Use of the embodiment of FIGS. 7–9 in placing short and long term medication dosages in container 68 is as was above described for the embodiment of FIGS. 1–6.

Commercial medicinal dosage containers are molded about a pin which defines a continuous interior sidewall, typically tapered to facilitate removal of the formed container from the forming pin.

In one embodiment of the '785 patent application, there is provided a medicine container, comprising an upstanding body having an open mouth and a hollow interior, the body defining an interior tapered surface bounding the hollow interior and a separator seated in the body and defining upper and lower compartments, the separator having an exterior tapered sidewall having the same taper angle as the body interior surface. A finding set forth in the '785 patent application is that a separator may be disposed in friction fit with the interior tapered sidewall of a medicine container at any desired vertical location in the container, without need for an adhesive.

Figure 10:
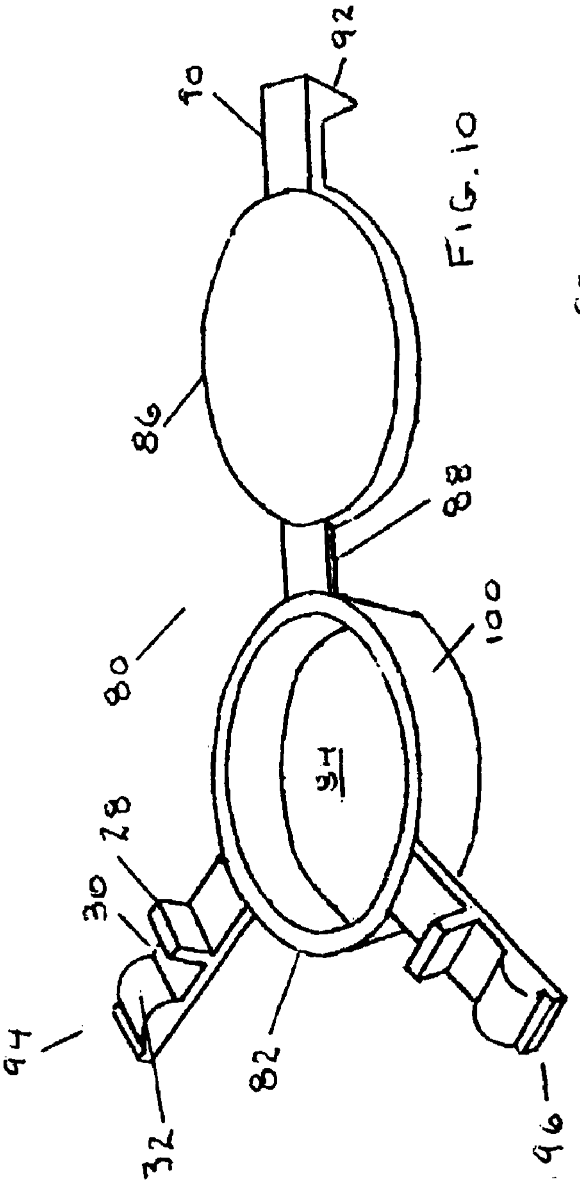
FIG. 10 is a perspective view of a third embodiment of a separator in accordance with the invention.
Figure 11:
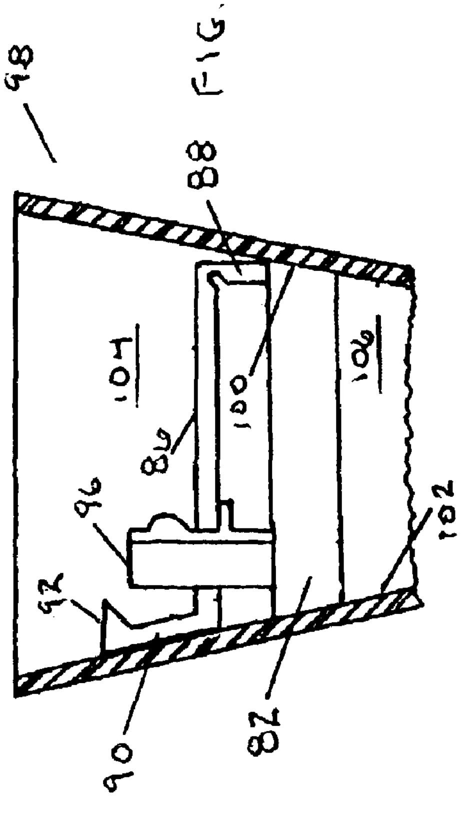
FIG. 11 is a perspective view of the separator of FIG. 10 assembled with a container, shown partially in central section.

Referring now to FIGS. 10 and 11, separator 80 has a ring-shaped portion 82 defining opening 84. Separating portion 86 is pivotally supported by hinge portion 88 and has tab portion 90 with gripping projection 92. Latching structures 94 and 96, configured as in the case of latching structures 24 and 26 above described, are pivotally supported by ring-shaped portion 82.

Separator 80 is inserted into the hollow interior of container 98 until the exterior tapered sidewall 100 of separator 80 is in friction-fit with container interior tapered sidewall 102. Latching structures 94 and 96 are displaced by sidewall 102 into dispositions such as is shown in FIG. 11 for latching structure 96. Separating portion 86 is now pivoted about hinge portion 88 into latched relation with latching structures 94 and 96. Upper and lower compartments 104 and 106 are now defined in container 98. Access to lower compartment 106 is gained through opening 84 of ring-shaped portion 82, upon pivoting separating portion 86 out of its latched state.

Figure 12:
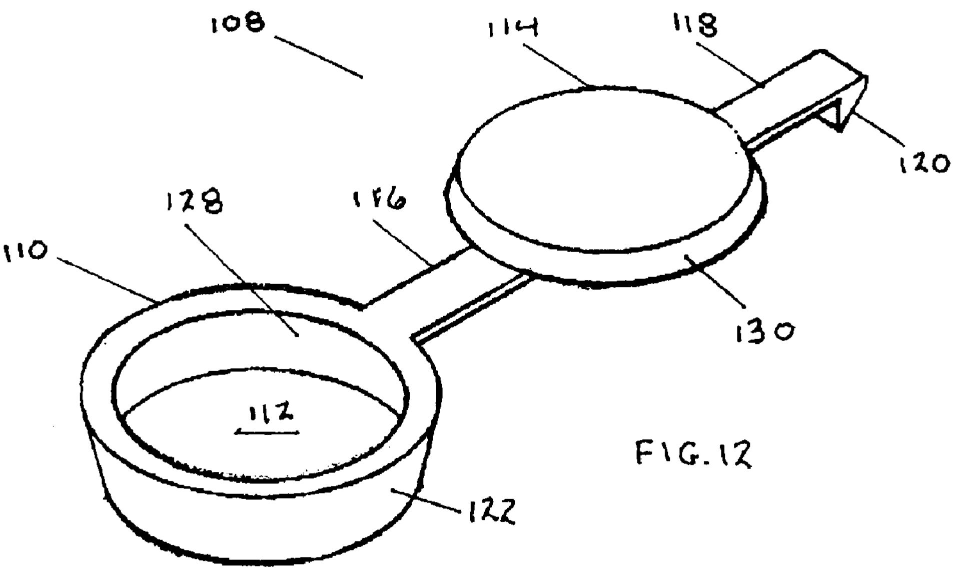
FIG. 12 is a perspective view of a fourth embodiment of a separator in accordance with the invention.
Figure 13:
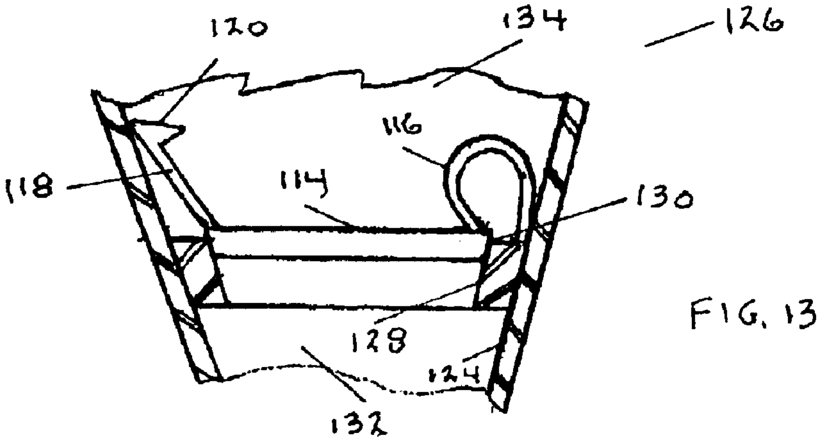
FIG. 13 is view of the separator of FIG. 12, shown in partial section, assembled with a container, shown partially in central section.

Turning to FIGS. 12 and 13, separator 108 has a ring-shaped portion 110 defining opening 112. Separating portion 114 is pivotally supported by hinge portion 116 and has tab portion 118 with gripping projection 120.

As is best seen in FIG. 13, ring-shaped portion 110 has its exterior surface 122 tapered, as in the embodiment of FIGS. 11 and 12, correspondingly with the taper of interior surface 124 of container 126 to effect frictional-fit of separator 108 in container 126. Further, interior surface 128 of ring-shaped portion 110 bounding opening 112 is also tapered. Exterior surface 130 of separating portion 114 is tapered correspondingly with interior surface 128 of ring-shaped portion 110. Separator 108 is inserted into the hollow interior of container 126 until the exterior tapered sidewall 122 of separator 108 is in friction-fit with container interior tapered sidewall 124.

Separating portion 114 is now pivoted about hinge portion 116 to overlie opening 112 of ring-shaped portion 110 and is then forced into opening 112 until exterior tapered surface 130 of separating portion 114 is in friction-fit with interior tapered sidewall 128 of ring-shaped portion 110. Ring-shaped portion 110 is now in releasably latched state, defining lower and upper compartments 132 and 134.

Figure 14:
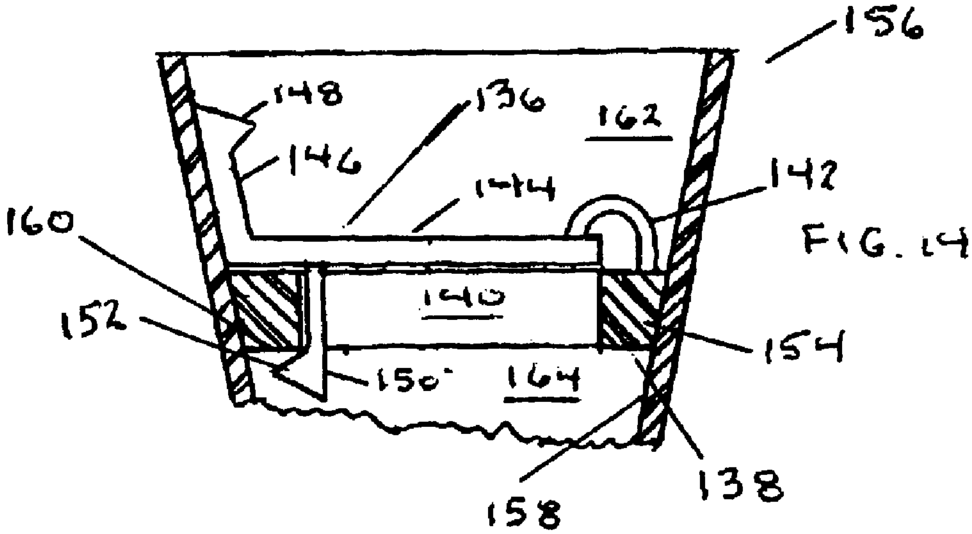
FIG. 14 is view of a fifth embodiment of a separator in accordance with the invention, shown in partial section, assembled with a container shown partially in central section.

Turning to FIG. 14, separator 136 includes ring-shaped portion 138 defining opening 140, hinge portion 142, separating portion 144, pivotally supported by hinge portion 142, tab portion 146 having gripping projection 148 and latching structure 150, depending from separating portion 144 and having claw 152. Exterior sidewall 154 of ring-shaped portion 138 is tapered to provide for friction-fit of separator 136 in container 156, the interior sidewall 158 of which is tapered correspondingly with sidewall 154. In FIG. 14, separator 136 is shown with separating portion 144 in releasably latched condition, with claw 152 engaging undersurface 160 of ring-shaped portion 138, defining lower and upper compartments 162 and 164.

Figure 15:
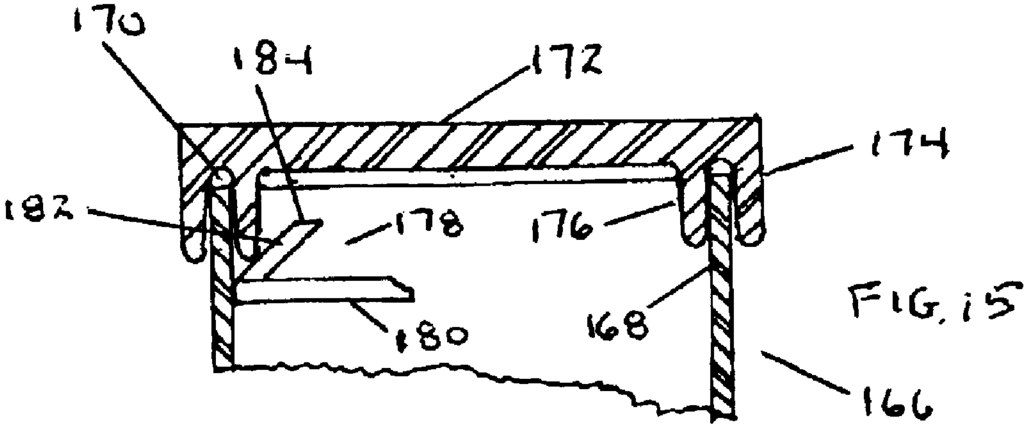
FIG. 15 is a partial view of a sixth embodiment of a separator in accordance with the invention, assembled with a container shown partially in central section and a closure member shown in central section.

FIG. 15 shows container 166, which is of type having its sidewall 168 adapted to enter a peripheral slot 170 of closure member 172. Slot 170 is defined by exterior peripheral rib 174 and interior peripheral rib 176 of closure member 172.

Separator 178 includes separating portion 180 and tab 182. In order to avoid interference with interior rib 176 of closure member 172 when the closure member is applied to container 166, tab 182 defines bevel 184 at its free end. In the course of applying closure member 172 to container 166, interior rib 176 engages bevel 184 and displaces tab 182 into its disposition indicated in FIG. 15.

Various changes may be introduced in the disclosed preferred embodiments and practices without departing from the invention. Accordingly, it is to be appreciated that the true spirit and scope of the invention is set forth in the following claims.

What is claimed is:

1. A separator insertable into a medicine container and thereupon defining upper and lower compartments in said medicine container, said separator having a separating portion pivotally supported for movement into a first position for forming said upper and lower compartments and into a second position providing access to said lower compartment, said separator including latching structure for releasably maintaining said separator portion in said first position, said separator portion defining a floor for said upper compartment and a ceiling for said lower compartment.

2. The separator claimed in claim 1, wherein said separator is comprised of a flexible sheet member defining said separating portion, a hinge portion for supporting said separating portion for said movement, and a lower portion depending from said hinge portion, said lower portion defining said latching structure.

3. The separator claimed in claim 2, wherein said latching structure extends upwardly of said lower portion and includes a shelf part and a detent part spaced upwardly of said shelf part, a recess being formed between said shelf part and said detent part, said separating portion residing in part in said recess when said separating portion is disposed in said first position.

4. The separator claimed in claim 1, wherein said separator further includes a tab portion for effecting said movement of said separating portion, said tab portion being pivotally supported by said separating portion.

5. The separator claimed in claim 2, wherein said latching structure extends orthogonally of said lower portion and extends in overlying relation to a margin of said separating portion when said separating portion is disposed in said first position.

6. The separator claimed in claim 5, wherein said separator further includes a tab portion for effecting said movement of said separating portion, said tab portion being pivotally supported by said separating portion.

7. The separator claimed in claim 1, wherein said separator defines exterior surface effecting a friction-fit of said separator in said container.

8. The separator claimed in claim 7, wherein said separator includes a ring-shaped portion and wherein said exterior surface of said separator is constituted by a tapered exterior surface of said ring-shaped portion.

9. The separator claimed in claim 8, wherein said ring-shaped portion defines a central opening, said separating member closing said central opening when said separating portion is disposed in said first position.

10. The separator claimed in claim 8, wherein said ring-shaped portion further has a tapered interior surface in part defining said latching structure.

11. The separator claimed in claim 8, wherein said ring-shaped portion defines a central opening and wherein said tapered interior surface bounds said central opening, said separating portion closing said central opening when said separating portion is disposed in said first position.

12. The separator claimed in claim 1, wherein said latching structure is constituted in part by an exterior surface of said separating portion.

13. The separator claimed in claim 12, wherein said separator includes a ring-shaped portion having an interior surface in further part constituting said latching structure.

14. The separator claimed in claim 13, wherein said exterior surface of said separating portion and said interior surface of said ring-shaped portion are both tapered surfaces.

15. The separator claimed in claim 14, wherein said ring-shaped portion defines a central opening, said separating member closing said central opening when said separating portion is disposed in said first position.

16. The separator claimed in claim 15, wherein said tapered interior surface of said ring-shaped portion bounds said central opening.

17. The separator claimed in claim 1, further including a ring-shaped portion defining a central opening, said latching structure including a latching member depending from said separating portion and extending through said central opening when said separating portion is in said first position.

18. The separator claimed in claim 17, wherein said latching member engages an undersurface of said ring-shaped portion when said separating portion is in said first position.

19. A medicine container, comprising an upstanding body having an open mouth and a hollow interior bounded by a sidewall and a separator resident in said container hollow interior, said separator having a separating portion pivotally supported for movement into a first position for forming upper and lower compartments in said container and into a second position providing access to said lower compartment, said separator including latching structure for releasably maintaining said separating portion in said first position, said separator portion defining a floor for said upper compartment and a ceiling for said lower compartment.

20. The container claimed in claim 19, wherein said container and said separator define mating surfaces for effecting a frictional-fit of said separator in said container.

* * * * *